Patented May 15, 1934

1,958,697

UNITED STATES PATENT OFFICE 1,958,697

IMPROVED MARGARINE AND METHOD OF MAKING THE SAME

Albert K. Epstein, Marvin C. Reynolds, and Benjamin R. Harris, Chicago, Ill.

No Drawing. Application July 27, 1933, Serial No. 682,424

5 Claims. (Cl. 99—13)

Our invention relates to an improved margarine and method of making the same.

Margarines in general are made with either animal or vegetable oils or fats emulsified with an aqueous liquid, the vegetable type being known in the industry sometimes as nut margarine. Margarines of this type contain a mixture of various oils, each manufacturer in general having his own formula. These formulas have always had certain things in common, principally in that in all of them a substantial quantity of a vegetable fat, solid at room temperature, is used. Examples of such solid vegetable fats are coconut oil, palm kernel oil, yellow or bleached palm oil, their hydrogenated products, and the like. Sometimes the formula includes a certain amount of hydrogenated fats or hydrogenated oils such as, for example, hydrogenated cottonseed oil, peanut oil, or the like, but in all cases a substantial amount of the normally solid oil or fat is used in order that the oleaginous constituent of the margarine emulsion may have the proper melting point.

It has been suggested that certain advantages may result by employing in margarine only fats or glycerides which are normally liquid at room temperature. Heretofore, however, it has been impossible to produce satisfactory margarine made exclusively with oils of this type. In order to make a satisfactory margarine having the desired plasticity at room temperature to permit it to be spread readily on bread, the liquid oil must be hydrogenated. It is well known that when a glyceride such as cottonseed oil, for example, is partially hydrogenated, all portions thereof do not become hydrogenated to the same extent; but there will be a fraction which will be substantially completely hydrogenated and may have a melting point of approximately 140° F.; there may be a fraction which is substantially unaffected by the hydrogenation; and there will be fractions between the two extremes. If a normally liquid glyceride is hydrogenated until it has a clearing point of 98 to 100° F., the margarine produced thereby will be too soft and will not possess the proper body at ordinary temperatures. If, however, the oil is hydrogenated to a point where it will produce a margarine having the proper body, say to have a clearing point of 106 to 108° F., or 110° F., then the resulting product will not melt readily in the mouth and will produce a sensation of gumminess, and will substantially mask the taste of the margarine.

The principal object of the present invention is the provision of an improved margarine.

Another object is the provision of a satisfactory margarine product made entirely from oils normally liquid at room temperature.

Another object is the production of margarine from normally liquid oils which will have the proper body at ordinary temperature and will not produce the sensation of gumminess in the mouth.

Other objects and features of the invention will be apparent as the disclosure progresses.

In carrying out the present invention, we employ a partially hydrogenated vegetable oil with a clearing point of about 97 to 100° F., that is, a clearing point approximating human body temperature, and treat it so that the lowest melting point constituent thereof will be in the neighborhood of room temperature. By treating the liquid oil first by hydrogenation and then by subsequent treatment as will be pointed out, all fractions thereof will have a melting point of not more than approximately 100° F. or slightly above, nor appreciably lower than 60 to 70° F. Margarine made with this type of vegetable oil will have sufficient body at ordinary temperatures but will not produce the sensation of gumminess when taken into the mouth as substantially all fractions thereof will melt at the temperature found in the mouth.

In carrying out the process we select a suitable liquid oil such as, for example, cottonseed oil. The liquid oil is then hydrogenated until it has a clearing point of about 100° F., care being taken so that no appreciable fraction of the oil has a melting point higher than 100° F. The oil is then melted and allowed to cool to a temperature of approximately 60 to 70° F. and maintained at this temperature for a sufficient time to allow the relatively higher melting point glycerides to seed out. By this means, all fractions having a melting point higher than room temperature or higher than 60 to 70° F. are crystallized out and can be separated from the liquid oil by suitable means, preferably straining under pressure. By this means, a fatty constituent is obtained having a relatively short melting point range, or between approximately ordinary room temperature and the temperature of the human body.

The product so produced can be employed in the manufacture of margarine, this oil constituent being employed in the usual way in which the oleaginous phase of margarine is treated in the ordinary process. As an example, it is melted at approximately 100° F. and churned with approximately 20% of cultured milk to form a substantially liquid margarine emulsion. The liquid emulsion is then crystallized, for example, in a body of cold water; the crystals tempered by raising them to a higher temperature but below the melting point of the emulsion, the excess water squeezed out, and the crystals kneaded into a plastic mass of butter-like consistency.

In the co-pending application of Marvin C. Reynolds, Serial No. 682,423, filed July 27, 1933, another method is disclosed for producing margarine with liquid oils and those skilled in the art are referred thereto for additional methods of securing the objects pointed out hereinabove.

We have described our invention in detail in order that those skilled in the art may know how to practice the same; it is obvious, however, that the scope of the invention is limited only by the appended claims.

What we claim as new and desire to protect by Letters Patent of the United States is:

1. The method of making margarine which comprises partially hydrogenating a liquid vegetable oil until it has a clearing point of approximately body temperature, separating from the oil the fraction thereof melting below approximately room temperature, heating the remaining portion of the hydrogenated oil to liquefy the same, churning the same with an aqueous liquid to form a relatively liquid emulsion, crystallizing the emulsion to solidify the same, and processing the solid emulsion to form the final plastic margarine product.

2. The method of making margarine which comprises partially hydrogenating a liquid vegetable oil until it has a clearing point of approximately body temperature, allowing the partially hydrogenated oil to stand at approximately room temperature to permit higher melting point constituents to seed out, separating the higher melting point constituents, melting said higher melting point constituents, churning the same with an aqueous liquid to form a substantially liquid emulsion, crystallizing the emulsion, and finally processing the resulting crystals to form a plastic margarine mass of butter-like consistency.

3. The method of making margarine which comprises partially hydrogenating a liquid vegetable oil until it has a clearing point of approximately body temperature, subjecting the partially hydrogenated oil to a temperature of between 60° F. and 70° F. to permit the relatively higher melting point fraction to seed out, separating the higher melting point fraction from the liquid fraction, melting the higher melting point fraction, churning the same with an aqueous liquid to form a substantially liquid margarine emulsion, crystallizing the same, and finally processing the crystallized emulsion to form a plastic margarine mass of butter-like consistency.

4. An improved margarine comprising oleaginous and aqueous materials, said oleaginous material comprising a mixture of partially hydrogenated glycerides, wherein the melting point range of said glycerides is substantially between room temperature and human body temperature.

5. An improved margarine comprising oleaginous and aqueous materials, wherein said oleaginous material comprises normally liquid vegetable oil partially hydrogenated, and all fractions thereof having a melting point range between approximately room temperature and human body temperature.

ALBERT K. EPSTEIN.
MARVIN C. REYNOLDS.
BENJAMIN R. HARRIS.